(12) United States Patent
Ito et al.

(10) Patent No.: US 8,994,287 B2
(45) Date of Patent: Mar. 31, 2015

(54) LIGHT SOURCE CONTROL DEVICE

(71) Applicant: Koito Manufacturing Co., Ltd., Tokyo (JP)

(72) Inventors: Masayasu Ito, Shizuoka (JP); Takao Muramatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 14/193,289

(22) Filed: Feb. 28, 2014

(65) Prior Publication Data

US 2014/0265890 A1    Sep. 18, 2014

(30) Foreign Application Priority Data

Mar. 14, 2013   (JP) ................................. 2013-051307

(51) Int. Cl.
*H05B 33/06* (2006.01)
*H05B 33/08* (2006.01)
*B60Q 1/00* (2006.01)

(52) U.S. Cl.
CPC .............. *H05B 33/0848* (2013.01); *B60Q 1/00* (2013.01)
USPC ......................... 315/224; 315/185 R; 315/307

(58) Field of Classification Search
CPC ........ H05B 37/00; H05B 37/02; H05B 33/00; H05B 33/02; H05B 33/08; H05B 33/0803; H05B 33/083; H05B 33/0833; H05B 33/0839; H05B 33/0842; H05B 33/0845; H05B 33/0848
USPC .............. 315/224, 307, 308, 185 R, 193, 291
See application file for complete search history.

(56) References Cited

U.S. PATENT DOCUMENTS

| | | | |
|---|---|---|---|
| 8,143,805 B2 * | 3/2012 | Peng ............................... | 315/291 |
| 8,629,619 B2 * | 1/2014 | Clauberg et al. .............. | 315/125 |
| 2009/0295300 A1 * | 12/2009 | King ......................... | 315/209 R |
| 2012/0268023 A1 * | 10/2012 | Yan et al. ....................... | 315/2 R |

FOREIGN PATENT DOCUMENTS

JP    2011192865    9/2011

* cited by examiner

*Primary Examiner* — David H Vu
(74) *Attorney, Agent, or Firm* — Abelman, Frayne & Schwab (57) ABSTRACT

Disclosed is a light source control device including a power conversion unit and a control unit. The power conversion unit includes a transfer capacitor provided between a primary side circuit and a secondary side circuit. The primary side circuit is configured such that a first inductor stores energy when a first switching element is ON. The secondary side circuit is configured such that the second inductor limits a changing speed of the driving current. The power conversion unit is configured such that the driving current is raised when the first switching element is ON. The control unit turns OFF when the magnitude of the driving current exceeds the first threshold value, and turns ON the first switching element when the magnitude of the driving current falls below the second threshold value smaller than the first threshold value.

17 Claims, 9 Drawing Sheets

TIME

LIGHT SOURCE CONTROL DEVICE

CROSS-REFERENCE TO RELATED APPLICATIONS

This application is based on and claims priority from Japanese Patent Application No. 2013-051307, filed on Mar. 14, 2013, with the Japan Patent Office, the disclosure of which is incorporated herein in its entirety by reference.

TECHNICAL FIELD

The present disclosure relates to a light source control device that controls a semiconductor light source such as a light emitting diode (LED).

BACKGROUND

LEDs having a relatively longer lifetime and lower power consumption have been used for vehicular lamps such as headlamps, instead of conventional halogen lamps having a filament. The degree of light emission, that is, the brightness of an LED depends on the magnitude of current flowing in the LED. Therefore, a lighting circuit is needed for adjusting the current flowing in the LED when the LED is used as a light source. Such a lighting circuit is normally provided with an error amplifier and conducts a feedback control so as to make the current flowing in the LED constant.

In Japanese Patent Application Laid-Open No. 2011-192865, the present inventors have proposed a technique in which an array of LEDs is employed as a light source and each LED is individually turned ON and OFF in order to make a light distribution of a headlight variable to conduct a precise light distribution control. In the lighting circuit described in Japanese Patent Application Laid-Open No. 2011-192865, a bypass switch is disposed in parallel to each of the LEDs and the bypass switch is turned ON/OFF to realize an individual turning ON/OFF of the LED.

However, in the bypass method described in Japanese Patent Application Laid-Open No. 2011-192865, the load varies at the time of switching ON/OFF of the respective bypass switches. As a result, a response speed of a driving circuit which generates a current to be supplied to the LED may cause the current to deviate from a target value in accordance with the variation in load.

Such a deviation of current from a target value, which is a problem to be solved, is not limited to the bypass method and may also occur in any light source control device having a load variation.

The present disclosure has been made in an effort to solve the problems, and intends to provide a light source control device having a good response characteristic with respect to a load variation.

SUMMARY

One aspect of the present disclosure relates to a light source control device. The light source control device includes a conversion unit which generates a driving current flowing in a target light source to be driven and a control unit which controls the conversion unit. The conversion unit includes a primary side circuit, a secondary side circuit, and a capacitor provided between the primary side circuit and the secondary side circuit. The primary side circuit includes a switching element and a first inductor, and is configured such that energy is stored in the first inductor when a switching element is ON. The secondary side circuit includes a second inductor and is configured such that a changing speed of the driving current is limited by the second inductor. The conversion unit is configured such that the driving current is raised when the switching element is ON. The control unit turns OFF the switching element when the magnitude of the driving current exceeds a first threshold value and turns ON the switching element when the magnitude of the driving current falls below a second threshold value which is smaller than the first threshold value.

In the light source control device, the light source may be a plurality of semiconductor light sources connected in series with each other. The light source control device may further include a bypass switch connected in parallel with at least some of the plurality of semiconductor light sources.

In the light source control device, when it is assumed that an average value of the first threshold value and the second threshold value, a minimum value of a voltage required for driving the light source and an ON/OFF frequency of the switching element are referred to as an average driving current, a minimum light source voltage and a driving frequency, respectively, the capacitance of the capacitor may be larger than the value obtained by dividing the average driving current by a value obtained by multiplying the driving frequency and the minimum light source voltage.

The control unit of the light source control device may further include a compensation unit which reduces the first threshold value as the period during which the switching element is ON becomes longer.

The conversion unit of the light source control device may further include a suppression unit which suppresses the driving current when the magnitude of the driving current exceeds a third threshold value larger than the first threshold value.

The suppression unit of the light source control device may be provided in parallel with the light source and is configured to cause some of the driving currents to bypass when the magnitude of the driving current exceeds the third threshold value.

In the light source control device, a DC input voltage may be applied to the one end of the first inductor, the other end of the first inductor may be connected to the one end of the switching element, a fixed voltage may be applied to the other end of the switching element, and the one end of the capacitor may be connected to the other end of the first inductor.

Further, an arbitrary combination of constitutional elements described above, or substitution of the constitutional elements or expressions of the present disclosure among an apparatus, a method or a system may be also effective as an aspect of the present disclosure.

According to the present disclosure, it is possible to improve a response characteristic of the light source control device with respect to a load variation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 2 is a schematic diagram illustrating the flow of current when a first switching element is ON.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, identical or equivalent constitutional elements, members or signals illustrated in respective drawings are denoted by the same reference numerals, and their repetitive descriptions may be appropriately omitted. Further, some of the members which are not important in description may be omitted in illustration of the respective drawings. Further, symbols affixed to voltages, currents or resistances may be used as indications of respective voltage values, current values or resistance values as needed.

In the present specification, "a state in which a member A is connected to a member B" includes a case in which the member A and the member B are indirectly connected to each other through another member that does not affect an electrical connection state between the member A and the member B, in addition to a case in which the member A and the member B are physically directly connected to each other. Similarly, "a state in which a member C is provided between the member A and the member B" includes a case in which the members A, B and C are indirectly connected to each other through another member that does not affect an electrical connection state between those members, in addition to a case in which the member A and the member C, or the member B and the member C are indirectly connected to each other.

The LED lighting circuit according to the embodiment has a configuration in which a smoothing capacitor of an output stage of a Cuk converter is excluded from the Cuk converter, and an ON/OFF control is conducted by a current hysteresis control instead. By doing this, even when a load is suddenly varied due to, for example, the individual switching of a target LED to be ON/OFF, an undesirable change of the driving current due to charging/discharging of the smoothing capacitor may be suppressed.

Figure 1:
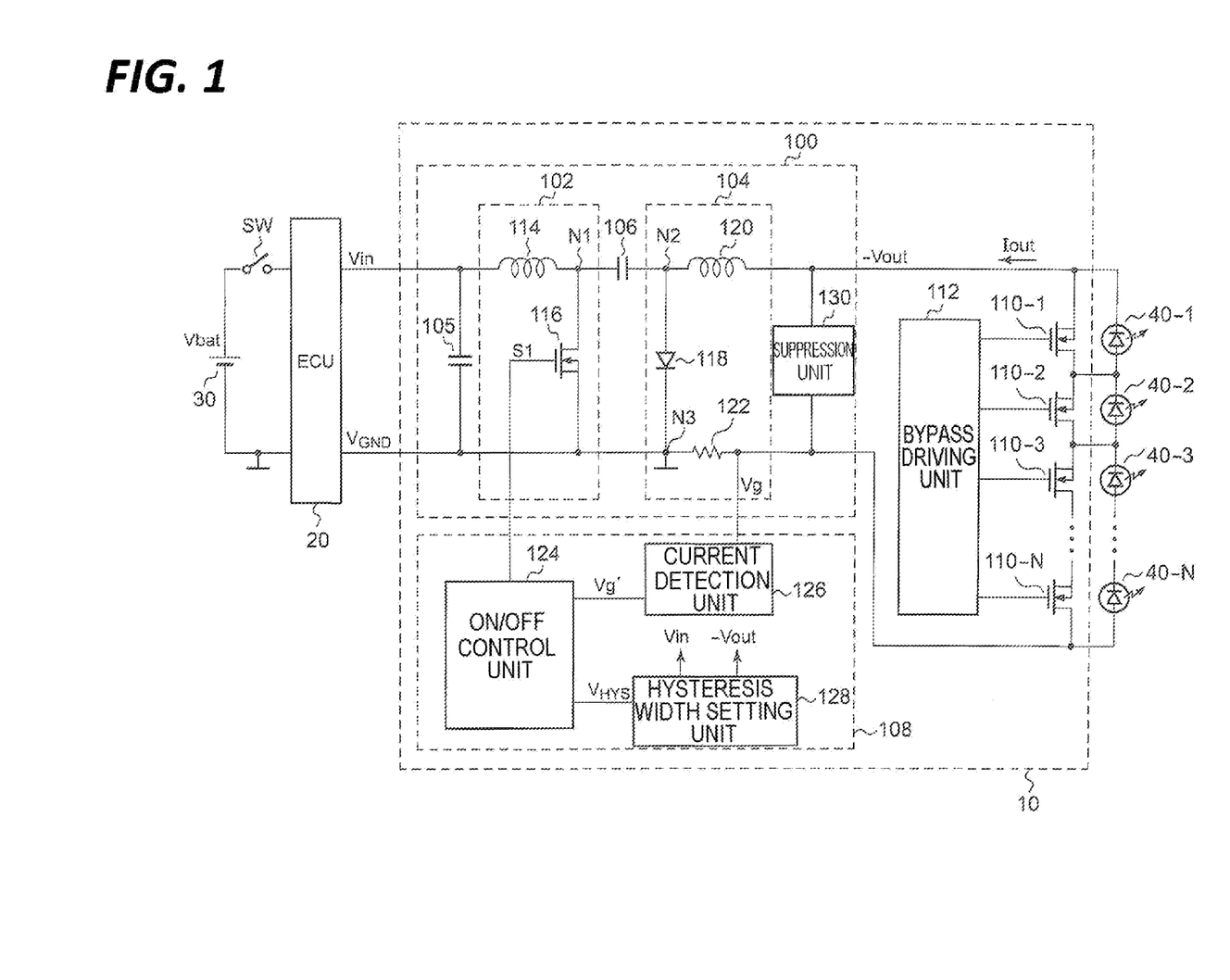
FIG. 1 is a circuit diagram illustrating the configuration of an exemplary LED lighting circuit according to an embodiment of the present disclosure.

FIG. 1 is a circuit diagram illustrating the configuration of an LED lighting circuit 10 according to an exemplary embodiment of the present disclosure. The LED lighting circuit 10 is connected to an electronic control unit (ECU) 20 and a plurality (N) of in-vehicle LEDs 40-1 to 40-N connected in series with each other. N is a natural number of 2 or more. The LED lighting circuit 10 and the N LEDs 40-1 to 40-N are installed on a vehicular lamp such as a headlamp. The LED lighting circuit 10 is a light source control device which controls the N LEDs 40-1 to 40-N that correspond to a light source.

The electronic control unit 20 is a micro-computer for comprehensively performing an electrical control of a vehicle such as an automobile. The electronic control unit 20 is connected to an in-vehicle battery 30 through a switch SW, and receives a battery voltage Vbat from the in-vehicle battery 30 when the switch SW turns ON. The electronic control unit 20 supplies the DC battery voltage Vbat to the LED lighting circuit 10 as an input voltage Vin. The electronic control unit 20 supplies a fixed voltage which is lower than the input voltage Vin, that is, a ground potential VGND (=0 V) to the LED lighting circuit 10.

The LED lighting circuit 10 steps up and down the input voltage Vin to generate an output voltage −Vout of negative polarity to apply the output voltage −Vout to the N LEDs 40-1 to 40-N. Here, the "Vout" is a positive value. The LED lighting circuit 10 supplies a driving current Iout to the N LEDs 40-1 to 40-N and turns on the N LEDs 40-1 to 40-N. The LED lighting circuit 10 includes a power conversion unit 100 which receives the input voltage Vin to generate the driving current Iout, a control unit 108 which controls the power conversion unit 100, a bypass driving unit 112, and N bypass switches 110-1 to 110-N.

The LED lighting circuit 10 is configured such that turning-ON and turning-OFF of the N LEDs 40-1 to 40-N may be individually controlled. Each of the N bypass switches 110-1 to 110-N is connected in parallel with a corresponding LED and is formed of, for example, an n-type metal oxide semiconductor field effect transistor (MOSFET). The bypass driving unit 112 supplies a control signal to a control terminal of each of the bypass switches 110-1 to 110-N. The bypass driving unit 112 controls a level of each control signal individually in order to obtain a desired brightness or light distribution pattern.

The power conversion unit 100 includes a primary side circuit 102, a secondary side circuit 104, an input capacitor 105, a transfer capacitor 106 and a suppression unit 130. The input voltage Vin is applied to one end of the input capacitor 105 and the other end thereof is grounded. The input capacitor 105 is provided in the vicinity of a first inductor 114 and implements a function of voltage smoothing with respect to a switching operation of a first switching element 116.

The transfer capacitor 106 is provided between the primary side circuit 102 and the secondary side circuit 104. The primary side circuit 102 includes the first switching element 116 and the first inductor 114 and is configured such that the first inductor 114 stores energy when the first switching element 116 is ON. The first switching element 116 may be, for example, an n-type MOSFET. One end of the first inductor 114 is connected to one end of the input capacitor 105 and the input voltage Vin is applied to one end of the first inductor 114. The other end of the first inductor 114 is connected to a drain of the first switching element 116. The source of the first switching element 116 is grounded. The first connection node N1 between other end of the first inductor 114 and the drain of the first switching element 116 is connected to one end of the transfer capacitor 106.

The conversion driving signal S1 is input to a gate of the first switching element 116 from the control unit 108. The conversion driving signal S1 is a signal having a rectangular waveform which is subjected to a pulse with modulation by current hysteresis control based on the magnitude of the driving current Iout. The first switching element 116 is turned ON/OFF according to an ON duty ratio determined by the conversion driving signal S1.

The secondary side circuit 104 includes a first diode 118, a second inductor 120 and a current detecting resistor 122, and is configured such that the second inductor 120 limits the changing speed of the driving current Iout. One end of the second inductor 120 is connected an anode of the first diode 118. A cathode of the first diode 118 is connected to one end of the current detecting resistor 122. The second connection node N2 between one end of the second inductor 120 and the anode of the first diode 118 is connected to the other end of the transfer capacitor 106. The third connection node N3 between the cathode of the first diode 118 and one end of the current detecting resistor 122 is grounded. The other end of the second inductor 120 is connected to a cathode side of the N LEDs 40-1 to 40-N. A voltage at the other end of the second inductor 120 is the output voltage −Vout.

The current detecting resistor 122 is disposed on a route of the driving current Iout which flows in the N LEDs 40-1 to 40-N. In the present embodiment, the current detecting resistor 122 is provided between the anode side of the N LEDs 40-1 to 40-N and a ground terminal A voltage drop generated due to the current detecting resistor 122 is supplied to the control unit 108 as a driving current detection voltage Vg. Since the driving current Iout flows in the current detecting resistor 122, the driving current detection voltage Vg becomes a voltage which depends on the magnitude of the driving current Iout.

The primary side circuit 102, the secondary side circuit 104 and the transfer capacitor 106 constitutes a configuration corresponding to a configuration in which a smoothing capacitor of the output stage of the Cuk converter is excluded from the Cuk converter. Accordingly, the power conversion unit 100 is an inversion-type converter which inverts and outputs the polarity of the input voltage Vin and the output voltage becomes the output voltage −Vout of negative polarity. Further, the power conversion unit 100 is configured such that the driving current Iout is raised when the first switching element 116 is ON.

Figure 2:
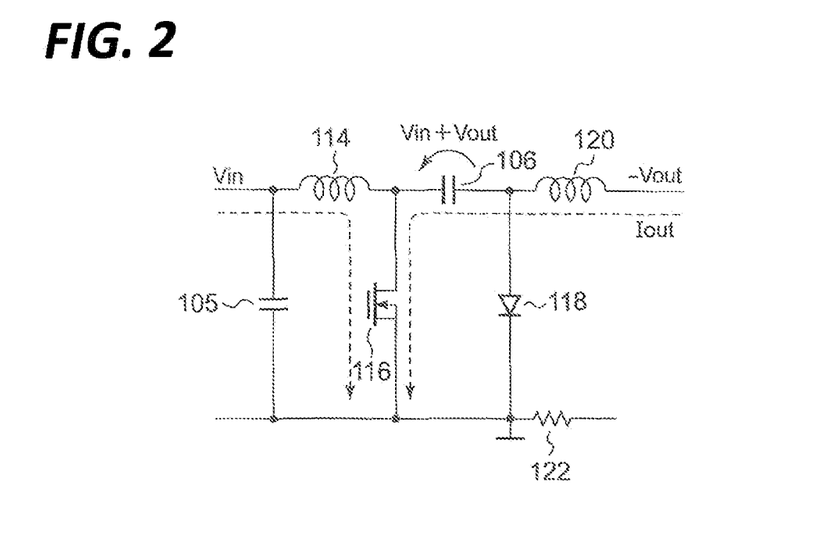
Figure 3:
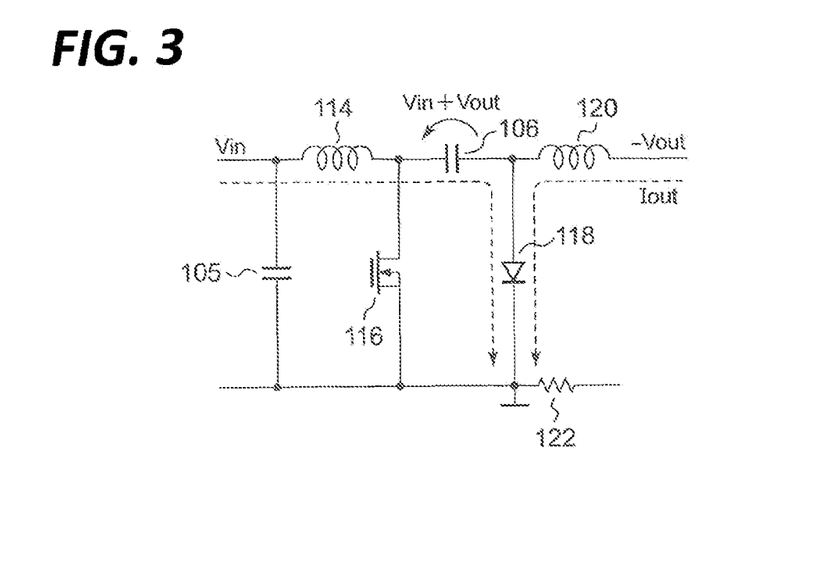
FIG. 3 is a schematic diagram illustrating the flow of current when the first switching element is OFF.

FIG. 2 is a schematic diagram illustrating a flow of current when the first switching element 116 is ON. FIG. 3 is a schematic diagram illustrating a flow of current when the first switching element is OFF. When the LED lighting circuit 10 is stably operated, the transfer capacitor 106 becomes in a state where it is charged with a voltage of "Vin+Vout". When the first switching element 116 is ON, energy is stored in the first inductor 114, the anode voltage of the first diode 118 becomes "−(Vin+Vout)", a current flowing in the second inductor 120, that is, the driving current Iout, increases and the transfer capacitor 106 is discharged. When the first switching element 116 is OFF, the transfer capacitor 106 is charged by the energy stored in the first inductor 114, the first diode 118 conducts the electricity to cause the anode voltage to become 0V, and the driving current Iout decreases.

Referring back to FIG. 1, when the magnitude of the driving current Iout exceeds a predetermined first threshold value Ith1, the control unit 108 turns OFF the first switching element 116, and when the magnitude of the driving current Iout falls below a second threshold value Ith2 which is lower than the first threshold value Ith1, the control unit 108 turns ON the first switching element 116. The control unit 108 includes an ON/OFF control unit 124, a current detection unit 126 and a hysteresis width setting unit 128.

The current detection unit 126 detects the driving current Iout. The current detection unit 126 acquires a driving current detection voltage Vg to detect the driving current Iout. The current detection unit 126 generates a detection current voltage Vg' corresponding to the magnitude of the detected driving current Iout and provides the detection current voltage Vg' to the ON/OFF control unit 124. The detection current voltage Vg' may be voltage obtained by scaling the driving current detection voltage Vg to become a predetermined value (e.g., 0.2 V) when the magnitude of the detected driving current Iout is a target value Im.

The hysteresis width setting unit 128 generates a hysteresis width voltage VHYS indicating a hysteresis width ΔI which is a difference between the first threshold value Ith1 and the second threshold value Ith2 based on the input voltage Vin and the output voltage, and provides the hysteresis width voltage $V_{HYS}$ to the ON/OFF control unit 124. The relationship between the hysteresis width ΔI, the input voltage Vin and the output voltage may be determined theoretically and experimentally. Otherwise, the target current setting unit 128 may set the hysteresis width Δ to a predetermined value which does not follow neither the input voltage Vin nor the output voltage.

Figure 4:
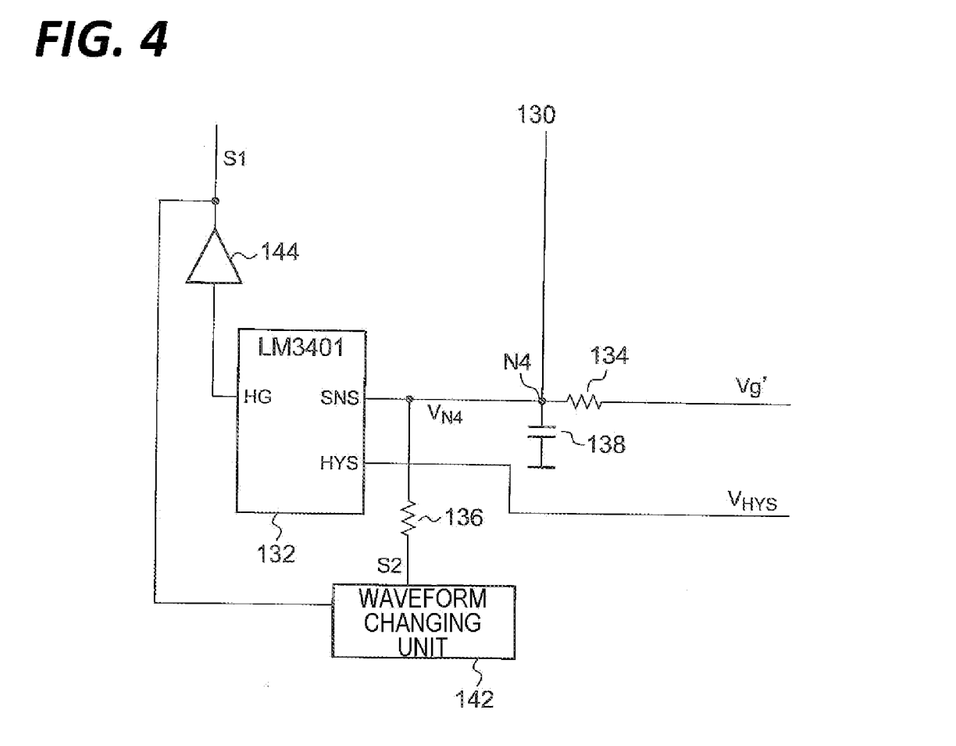
FIG. 4 is a circuit diagram illustrating the configuration of an ON/OFF control unit of FIG. 1

FIG. 4 is a circuit diagram illustrating a configuration of the ON/OFF control unit 124. The ON/OFF control unit 124 includes a hysteresis control IC (Integrated Circuit) 132, a first resistor 134, a second resistor 136, a first capacitor 138, a waveform changing unit 142 and a switch driver 144.

The detection current voltage Vg' is applied to one end of the first resistor 134. The other end of the first resistor 134 is connected to one end of the first capacitor 138. The other end of the first capacitor 138 is grounded. The voltage VN4 at the fourth connection node N4 between the other end of the first resistor 134 and one end of the first capacitor 138 is provided to the suppression unit 130 to be described below and applied to one end of the second resistor 136. The other end of the second resistor 136 is connected to the waveform changing unit 142.

The hysteresis control IC 132 is an IC implementing a hysteresis control and may be, for example, LM3401 manufactured by Texas Instruments, Inc. The LM3401 which is the current hysteresis control IC includes a SNS terminal, a HYS terminal and a HG terminal. The voltage VN4 at the fourth connection node N4 is applied to the SNS terminal. The hysteresis width voltage VHYS is applied to the HYS terminal. The hysteresis control IC 132 controls a voltage level of the HG terminal such that an average value of the voltage VN4 at the fourth connection node N4 becomes 0.2 V.

When there is no operation by the waveform changing unit 142 to be described below, the hysteresis control IC 132 sets "Im+ΔI/2" and "Im−ΔI/2" as the first threshold value Ith1 and the second threshold value Ith2, respectively. That is, when the magnitude of the detected driving current Iout exceeds the "Im+ΔI/2", the hysteresis control IC 132 set the voltage of the HG terminal as a high level and when the magnitude of the detected driving current Iout falls below the "Im−ΔI/2", the hysteresis control IC 132 set the voltage of the HG terminal as a low level.

The switch driver 144 inverts and outputs the signal output from the HG terminal of the hysteresis control IC 132 to the gate of the first switching element 116 as a conversion driving signal S1. The switch driver 144 may be, for example, TPS2818 manufactured by Texas Instruments, Inc.

The waveform changing unit 142 acts on the voltage VN4 at the fourth connection node N4 such that the first threshold value Ith1 becomes smaller as the ON period of the first switching element 116 becomes gradually longer. The waveform changing unit 142 executes so-called a slope compensation. The waveform changing unit 142 overlaps a triangular wave on a control signal to make the change in duty ratio of the first switching element 116 small to cause a slow response of the control signal to suppress an oscillation.

Figure 5:
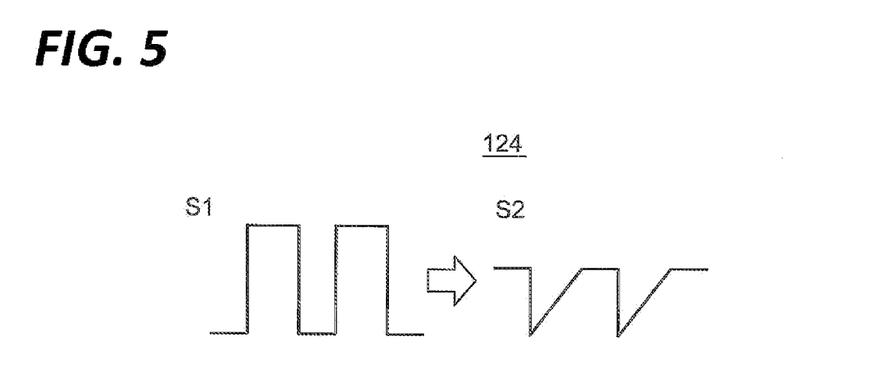
FIG. 5 is a schematic diagram for explaining a conversion operation in a waveform changing unit of FIG. 4.

FIG. 5 is a schematic diagram for explaining a conversion operation in a waveform changing unit 142. The waveform changing unit 142 converts the conversion driving signal S1 which is a rectangular wave into a triangular wave in which the voltage increases in a period during which the conversion driving signal S1 is at a high level to generate a slope compensation signal S2 and connects the slope compensation signal S2 to a current control line through the second resistor 136. When a peak voltage of the triangular wave is made high or a resistance value of the second resistor 136 is made small, the triangular wave propagates in a direction in which oscillation is suppressed.

Figure 6:
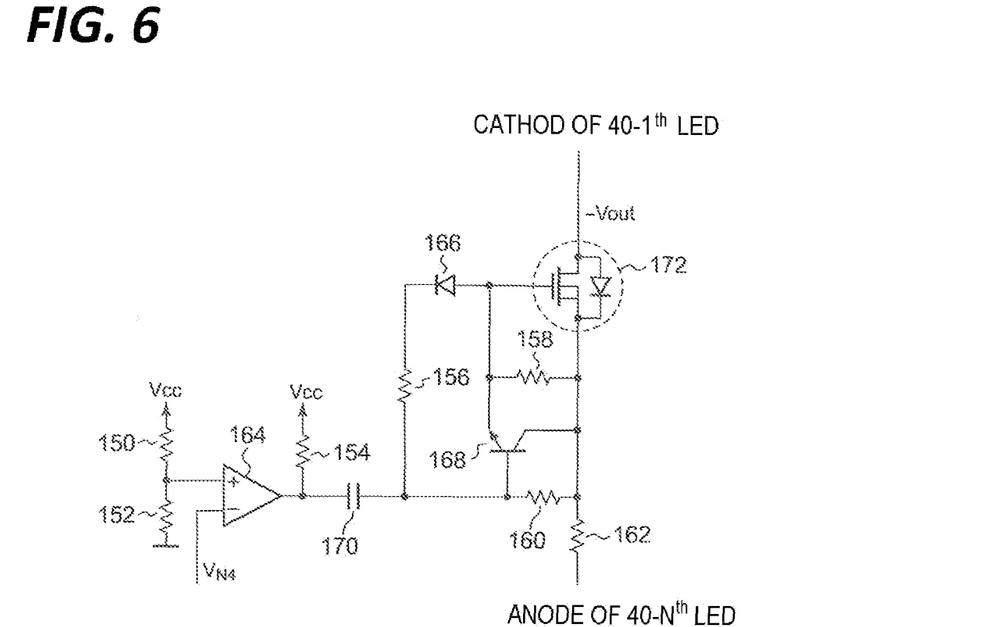
FIG. 6 is a circuit diagram illustrating the configuration of a suppression unit of FIG. 1.

FIG. 6 is a circuit diagram illustrating a configuration of the suppression unit 130. When the magnitude of the driving current Iout exceeds a third threshold value Ith3 larger than the first threshold value Ith1, the suppression unit 130 suppresses the driving current Iout. In particular, the suppression unit 130 is provided in parallel with the N LEDs 40-1 to 40-N, and configured to cause some of the driving current Iout to bypass when the magnitude of the driving current Iout exceeds the third threshold value Ith3.

The suppression unit 130 includes a third resistor 150, a fourth resistor 152, a fifth resistor 154, a sixth resistor 156, a seventh resistor 158, an eighth resistor 160, a ninth resistor 162, a comparator 164, a second diode 166, a NPN-type bipolar transistor 168, a second capacitor 170 and a suppression switch 172. The suppression switch 172 may be, for example, a p-type MOSFET.

The third resistor 150 and the fourth resistor 152 constitute a voltage divider circuit which divides the power supply voltage Vcc of about 5 V into a voltage having a magnitude that corresponds to a predetermined fraction of the power supply voltage Vcc. The voltage divider circuit applies a divided voltage Vdiv (e.g., 0.25 V) which corresponds to the third threshold value Ith3 to a non-inverting input terminal of the comparator 164. The voltage VN4 at the fourth connection node N4 is applied to an inverting input terminal of the comparator 164. The power supply voltage Vcc is applied to one end of the fifth resistor 154 and the other end of the fifth resistor 154 is connected to an output terminal of the comparator 164 and one end of the second capacitor 170. The other end of the second capacitor 170 is connected to one end of the sixth resistor 156, a base of the NPN-type bipolar transistor 168 and one end of the eighth resistor 160. The other end of the sixth resistor 156 is connected to a cathode of the second diode 166 and an anode of the second diode 166 is connected to a gate of the suppression switch 172. A drain of the suppression switch 172 is connected to a cathode of the first LED 40-1. A source of the suppression switch 172 is connected to one end of the seventh resistor 158, a collector of the npn-type bipolar transistor 168, the other end of the eighth resistor 160 and one end of the ninth resistor 162. The other end of the ninth resistor 162 is connected to an anode of the Nth LED 40-N. The other end of the seventh resistor 158 is connected to an emitter of the npn-type bipolar transistor 168 and the anode of the second diode 166.

In the suppression unit 130, when the voltage VN4 of the fourth connection node N4 exceeds the divided voltage Vdiv (the magnitude of the driving current Iout amounts to the third threshold value Ith3), the suppression switch 172 is turned ON. The bypass current flowing in the suppression unit 130 is limited by the ninth resistor 162. The voltage between the gate and the source of the suppression switch 172 decreases to a voltage obtained in a time constant regulated by the second capacitor 170 and the eighth resistor 160 and the bypass current flowing in the suppression unit 130 also decreases.

Figure 7:
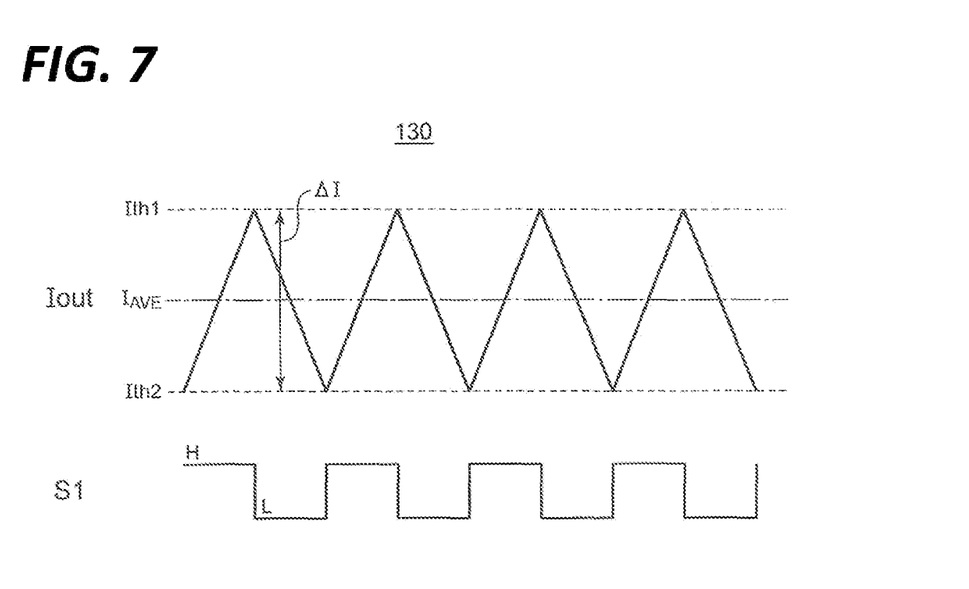
FIG. 7 is a waveform diagram schematically illustrating an operation state of the LED lighting circuit of FIG. 1.

An operation of the LED lighting circuit 10 according to the configuration described above will be described. FIG. 7 is a waveform diagram schematically illustrating an operation state of the LED lighting circuit 10. FIG. 7 illustrates a magnitude of the driving current Iout and the conversion driving signal S1 in this order from top. FIG. 7 illustrates a waveform in a case where the waveform changing unit 142 is not present or an influence by the waveform changing unit 142 may be negligible. In particular, the influence by the waveform changing unit 142 becomes smaller as the ON period of the first switching element 116 becomes shorter.

When the conversion driving signal S1 is at a high level, the first switching element 116 is in an ON state, the driving current Iout increases (see, for example, FIG. 2). When the driving current Iout increases and reaches the first threshold value Ith1, the conversion driving signal S1 shifts to a low level and the first switching element 116 becomes an OFF state. The driving current Iout also decreases when the first switching element 116 is in the OFF state (see, for example, FIG. 3). When the driving current Iout decreases and reaches the second threshold value Ith2, the conversion driving signal S1 shifts to the high level again. The average value $I_{AVE}$ of the first threshold value Ith1 and the second threshold value Ith2 is set to a target value Im.

Further, the slope compensation by the waveform changing unit 142 acts to either gradually decrease the first threshold value Ith1 or cause an increase speed of the driving current Iout in appearance to be large during the ON period of the first switching element 116 in the waveform of the driving current Iout illustrated in FIG. 7. This action may be referred to as an action that causes the first threshold value Ith1 to be small as the ON period of the first switching element 116 becomes longer in a relative relationship between the driving current Iout and the first threshold value Ith1.

In the LED lighting circuit 10 according to the present embodiment, since the smoothing capacitor is not provided at an output stage to the N LEDs 40-1 to 40-N, a follow-up property of the driving current Iout which depends on the ON/OFF of the first switching element 116 is improved. In particular, when the first switching element 116 is turned OFF, the driving current Iout decreases, and when the first switching element 116 is turned ON, the driving current Iout increases. Also, the current hysteresis control of the driving current Iout is employed instead of smoothing in order to stabilize the driving current Iout in the vicinity of the target value Im. As a result, a rapid response in a current feedback may be implemented. For example, when the number of LEDs that are turned ON is changed by the action of the bypass driving unit 112 and the bypass switch, it is possible to cause the driving current Iout to follow up rapidly with respect to such a load variation. In particular, it is possible to suppress undershoot of the driving current Iout when the number of LEDs that are turned ON is increased or an overshoot of the driving current Iout when the number of LEDs that are turned ON is decreased.

Further, in the power conversion unit 100, stepping-up and/or stepping-down of the input voltage Vin is implemented by a single-stage converter. Accordingly, it is possible to reduce the number of components and enhance a power efficiency compared with a multiple-stage converter.

For example, in a known SEPIC converter, when the switching element is ON, the driving current decreases and when the switching element is OFF, the driving current increases. In this case, if the driving current may deviate from a range between two threshold values due to an abrupt variation in a load or an input voltage, when the driving current deviates below the lower threshold value, turning OFF of the switching element is continued and thus, energy from the input voltage may not be stored, and decreasing of the driving current is continued. When the driving current deviates above the upper threshold value, turning ON of the switching element is continued and thus, a large quantity of energy is accumulated. In contrast, the LED lighting circuit 10 according to the present embodiment is configured such that when the first switching element 116 is turned OFF, the driving current Iout becomes small and when the first switching element 116 is turned ON, the driving current Iout becomes large. Therefore, an increase in control that is likely to occur in the SEPIC converter may be prevented.

Hereinafter, descriptions will be made on a generation mechanism of the overshoot and undershoot of the driving current Iout in the LED lighting circuit 10 and countermeasure thereof based on experiments and reviews by the present inventors' own.

As described above, the overshoot and undershoot may be suppressed in the LED lighting circuit 10 as compared with a case where the smoothing capacitor is provided on the output stage. However, there may be a case where a level of the overshoot or undershoot may occur in an ascertainable degree or is negligible due to, for example, setting of a circuit constant. The present inventors found out, by their own review, that the overshoot and undershoot may be suppressed by making a coefficient of induction of the second inductor 120 large and making a capacitance of the transfer capacitor 106 small (that is, making LC resonant energy small and making the peak current to reduce).

Figure 8:
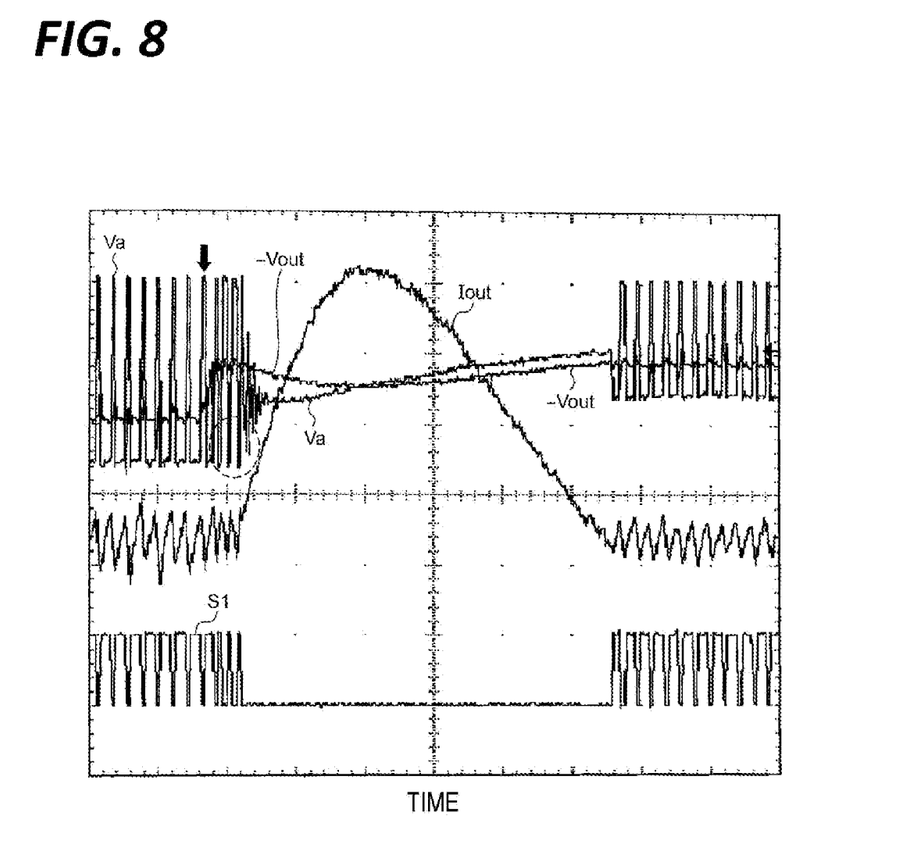
FIG. 8 is a waveform diagram when an overshoot occurs by suddenly making the number of connected LEDs small in a comparative example.
Figure 9:
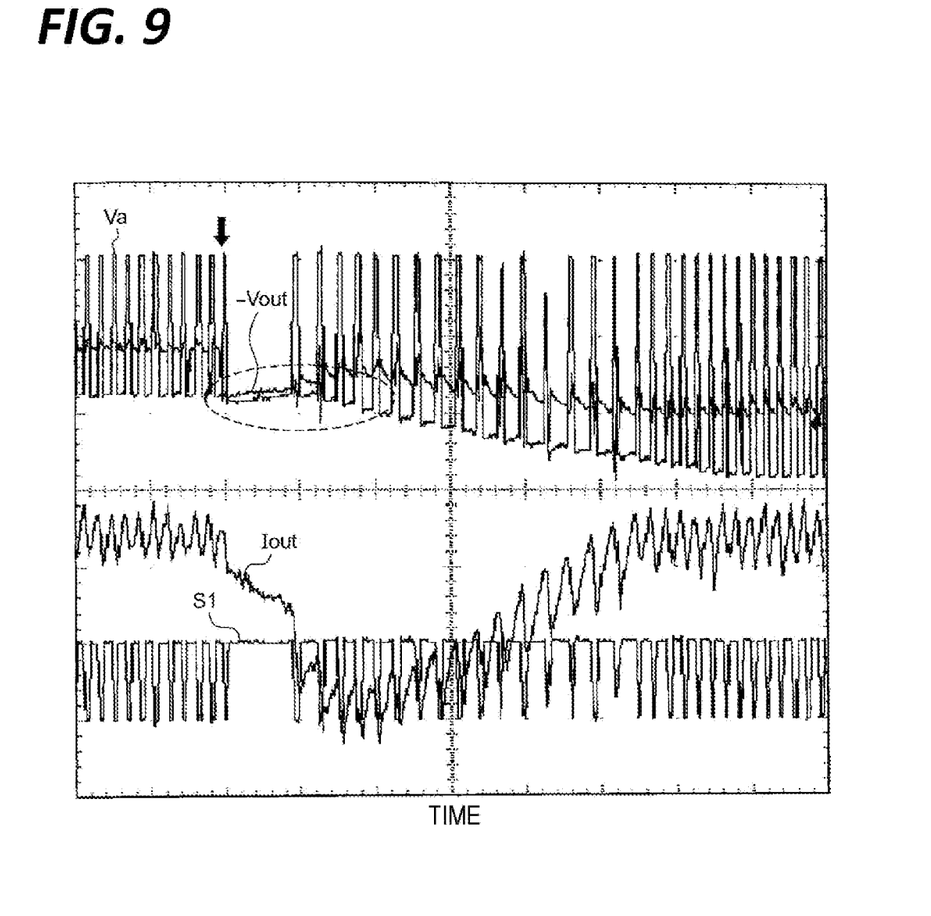
FIG. 9 is a waveform diagram when an undershoot occurs by suddenly making the number of connected LEDs large in the comparative example.

For the sake of reviewing, a comparative example in which the capacitance of the transfer capacitor 106 is intentionally made large and the coefficient of induction coefficient of the second inductor 120 is made intentionally small is considered. FIG. 8 is a waveform diagram when an overshoot occurs by suddenly making the number of connected LEDs less in the comparative example. Suddenly decreasing the number of connected LEDs corresponds to turning-ON of several bypass switches of the N bypass switches 110-1 to 110-N. FIG. 9 is a waveform diagram when the undershoot occurs by suddenly increasing the number of connected LEDs in the comparative example. Suddenly increasing the number of connected LEDs corresponds to turning-OFF of several bypass switches of the N bypass switches 110-1 to 110-N.

The timing at which the number of LEDs is changed is represented by a thick arrow in FIG. 8 and FIG. 9. The output voltage −Vout is changed in stepwise fashion before and after the thick arrow. Before and after the bold arrow, the anode voltage Va of the first diode 118 repeatedly shifts from "−(Vin+Vout)" to 0 V and vice versa, and the transfer capacitor 106 is charged with a voltage of "Vin+Vout".

In the waveform of FIG. 8 in which the number of LEDs is decreased, the charge voltage of the transfer capacitor 106 is larger than the "Vin+Vout" in an area represented and encircled with the broken line. That is, the transfer capacitor 106 is in an excessive charge state, and the transfer capacitor 106 discharges current through the first inductor 114 to the input voltage Vin side and thus, leads to an overshoot of the driving current Iout.

In the waveform of FIG. 9 in which the number of LEDs is increased, the charge voltage of the transfer capacitor 106 is smaller than the "Vin+Vout" in an area represented and encircled with the broken line. That is, the transfer capacitor 106 is in an insufficient charge state and a voltage sufficient for increasing the driving current Iout may not be supplied and thus, leads to undershoot of the driving current Iout.

Accordingly, it is effective to make the capacitance of the transfer capacitor 106 small in order to suppress the overshoot/undershoot of the driving current Iout. Further, the driving current Iout during the overshoot corresponds to a resonant current of the transfer capacitor 106, the first inductor 114 and the second inductor 120, making the coefficient of induction of the second inductor 120 large is effective to suppress the overshoot. However, when the coefficient of induction of the second inductor 120 becomes large, the changing speed of the driving current Iout becomes small. Therefore, when the coefficient of induction of the second inductor 120 is made large excessively, a problem may occur in the switching operation or switching frequency of the first switching element 116.

When the capacitance of the transfer capacitor 106 is made small, oscillation occurs easily in the current feedback control. Oscillation refers to a phenomenon that a state at which a duty ratio comes closer to its maximum and a state where the duty ratio comes closer to its minimum are repeated alternately at a predetermined frequency. The present inventors found out the following two methods as a method in which occurrence of the oscillation is suppressed and also the capacitance of the transfer capacitor 106 is made small.

(1) A method in which the coefficient of induction of the first inductor 114 is made small according to decrement of the capacitance of the transfer capacitor 106.

(2) A method in which a response to control is made to slow.

Figure 10:
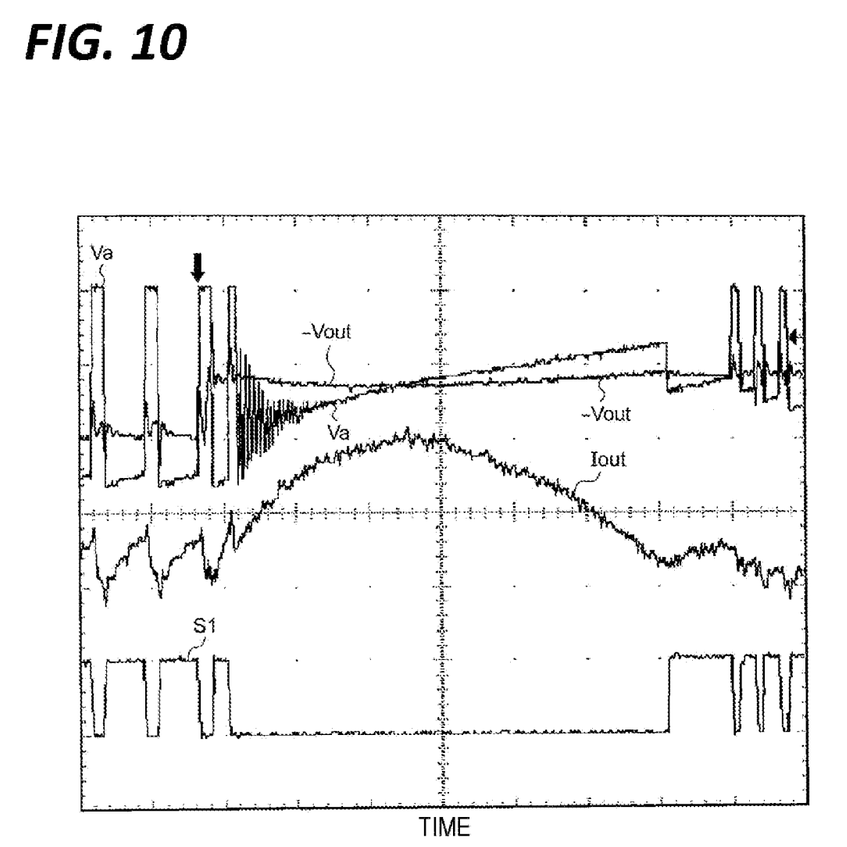
FIG. 10 is a waveform diagram when an overshoot occurs by suddenly making the number of connected LEDs small in the embodiment.
Figure 11:
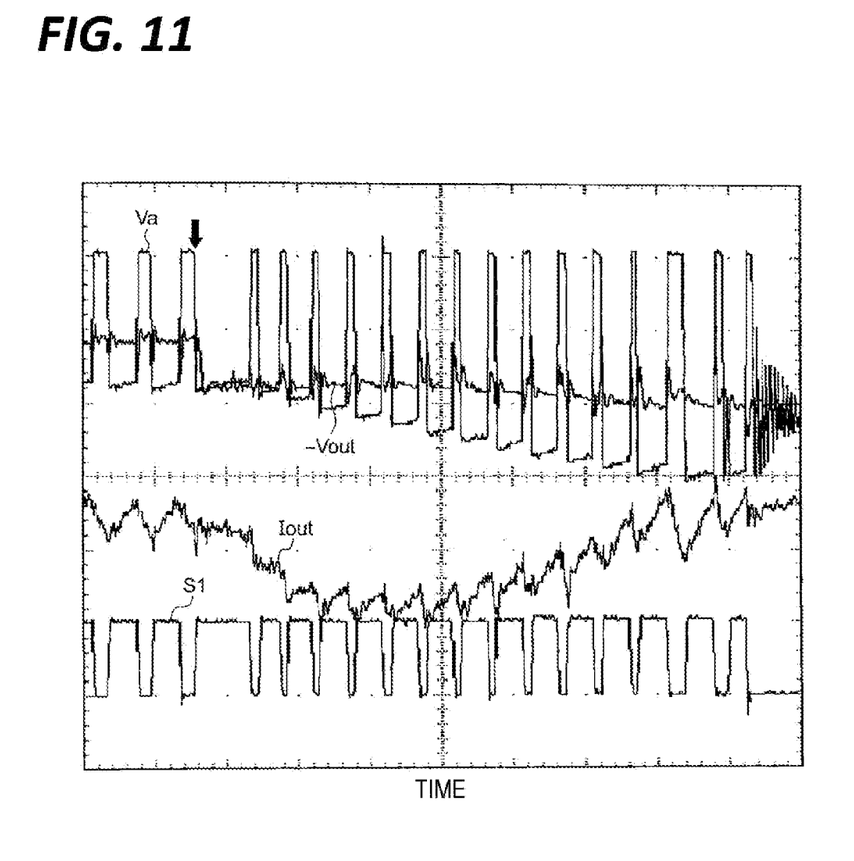
FIG. 11 is a waveform diagram when an undershoot occurs by suddenly making the number of connected LEDs large in the embodiment.

In responding to method (1), the capacitance of the transfer capacitor 106 and the coefficient of induction of the first inductor 114 are set to be small in the LED lighting circuit 10 according to the present embodiment. FIG. 10 is a waveform diagram when an overshoot occurs by suddenly making the number of connected LEDs small in the embodiment. The waveform of FIG. 10 corresponds to a waveform in a case where the suppression unit 130 does not act. FIG. 11 is a waveform diagram when an undershoot occurs by suddenly making the number of connected LEDs large in the embodiment. Scales of the graphs of FIG. 10 and FIG. 11 correspond to those of the graphs of FIG. 8 and FIG. 9, respectively. It may be understood that the capacitance of the transfer capacitor 106 and the coefficient of induction of the first inductor 114 may be set to be small to suppress overshoot and undershoot.

In responding to method (2), the LED lighting circuit 10 according to the present embodiment has a function of slope compensation by the waveform changing unit 142. The slope compensation function acts to reduce the ON period of the first switching element 116. Accordingly, it becomes difficult for the state at which the duty ratio comes closer to its maximum to occur and thus, oscillation may be suppressed. Further, the capacitance of the transfer capacitor 106 may be further reduced by as much as suppression of occurrence of the oscillation.

Further, there is a demand that although a single LED exists as a load, a satisfactory energy transfer should be performed in transferring energy through the transfer capacitor 106.

When the voltage of the transfer capacitor 106 does not fall below a forward drop voltage Vf of a single LED due to charges which move during the driving current IAVE flows for a switching period 1/f, the demand is satisfied. This relationship may be represented as follows. Here, the capacitance of the transfer capacitor 106 is denoted by Cs.

$$Cs \times Vf > IAVE \times (1/f)$$

Further, all of units conform to MKS system of units.

Cs is set to satisfy the relational expression described above. Further, when the forward drop voltages of the N LEDs 40-1 to 40-N are substantially equal to each other, Vf corresponds to the forward drop voltage of a single LED and thus Vf is the minimum value of the voltage required for driving the N LEDs 40-1 to 40-N. The inverse number f of the switching period corresponds to an ON/OFF frequency of the first switching element 116.

In the LED lighting circuit 10 according to the embodiment, when the magnitude of the driving current Iout exceeds the third threshold value Ith3, the suppression unit 130 causes some of the driving current Iout to bypass. Accordingly, extra charges accumulated in the transfer capacitor 106 when overshoot occurs may be consumed in the suppression unit 130. By doing this, it is possible to suppress an amount of increase of the driving current Iout when an overshoot occurs. An influence by an overshoot is larger than that by an undershoot due to, for example, maximum ratings from a viewpoint of a lifetime of LED. Accordingly, it is possible to more effectively suppress the overshoot to lengthen the lifetime of LED.

Figure 12:
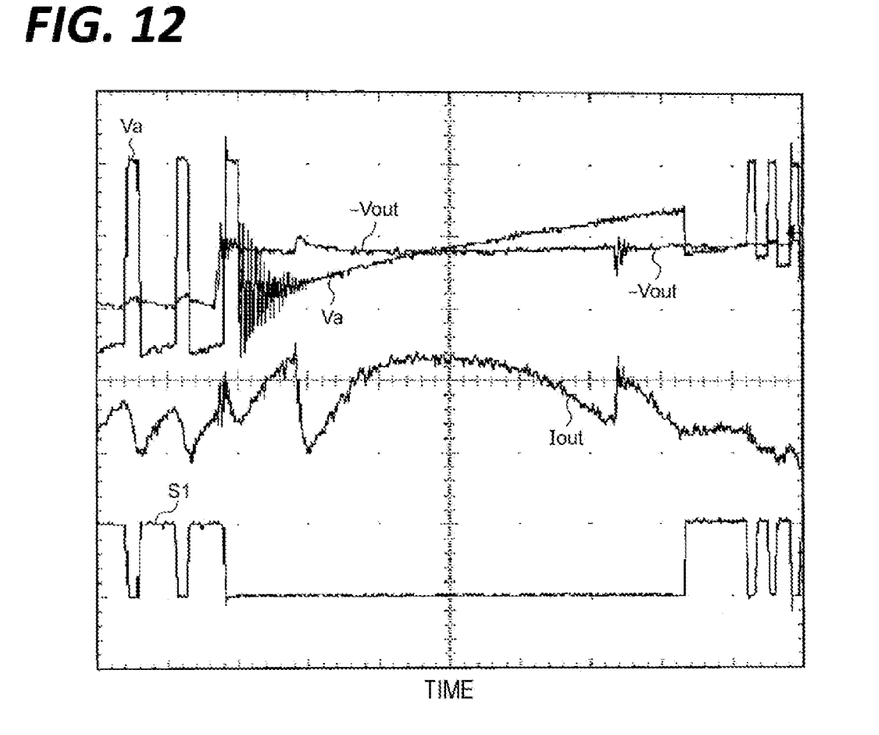
FIG. 12 is a waveform diagram when an overshoot occurs by suddenly making the number of connected LEDs small in the embodiment.

FIG. 12 is a waveform diagram when an overshoot occurs by suddenly making the number of connected LEDs small in the embodiment. The waveform of FIG. 12 corresponds to a waveform on which the suppression unit 130 acts. It may be understood that the amount of increase of the driving current Iout is suppressed when an overshoot occurs as compared to waveform of FIG. 10.

Up to now, the configuration and operation of the LED lighting circuit 10 according to the embodiment has been described. This embodiment is exemplary, and a fact that various modifications may be made on respective constitutional elements or combinations of respective processes and the modifications fall within the scope of the present disclosure may be understood by an ordinary skilled person in the art.

In the embodiment, the LED lighting circuit 10 which has a configuration in which the smoothing capacitor of output stage of the Cuk converter is excluded from the Cuk converter and the ON/OFF of the switching element of the Cuk converter is controlled by the current hysteresis control instead, but the configuration of the present disclosure is not limited thereto. For example, an LED lighting circuit according to a first modified example may have a configuration in which a smoothing capacitor of an output stage of a Zeta converter is excluded from the Zeta converter and an ON/OFF of the switching element of the Zeta converter is controlled by a current hysteresis control instead.

Figure 13:
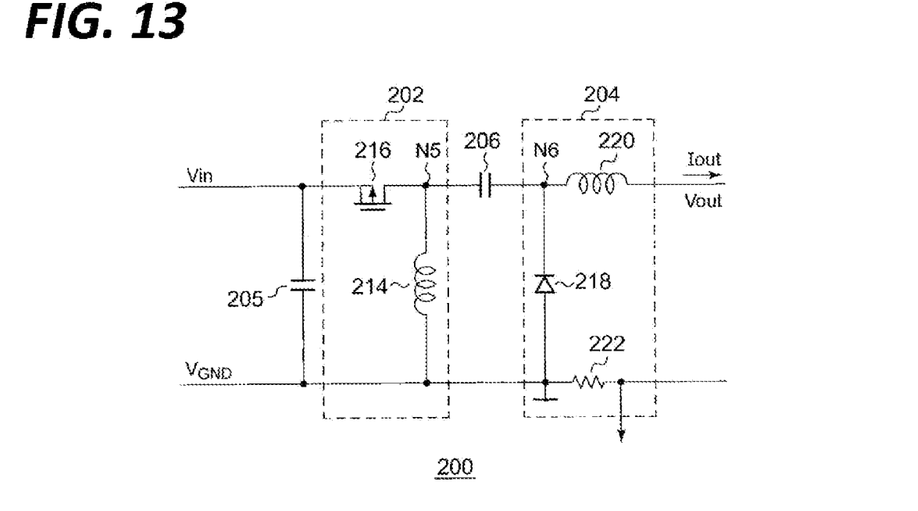
FIG. 13 is a circuit diagram illustrating the configuration of a power conversion unit of the LED lighting circuit according to a first modified example.

FIG. 13 is a circuit diagram illustrating a configuration of a power conversion unit 200 of the LED lighting circuit according to the first modified example. The power conversion unit 200 includes a primary side circuit 202, a secondary side circuit 204, an input capacitor 205 corresponding to the input capacitor 105, and a transfer capacitor 206. The transfer capacitor 206 is provided between the primary side circuit 202 and the secondary side circuit 204.

The primary side circuit 202 includes a second switching element 216 and a third inductor 214, and is configured such that a third inductor 214 stores energy when a second switching element 216 is ON. The second switching element 216 may be, for example, p-type MOSFET. A source of the second switching element 216 is connected to one end of the input capacitor 205 and the input voltage Vin is applied to the source of the second switching element 216. A drain of the second switching element 216 is connected to one end of the third inductor 214. The other end of the third inductor 214 is grounded. A fifth connection node N5 between the drain of the second switching element 216 and one end of the third inductor 214 is connected to one end of the transfer capacitor 206. The second switching element 216 is turned ON/OFF based on the current hysteresis control similarly to the first switching element 116.

The secondary side circuit 204 includes a third diode 218, a fourth inductor 220 and a current detecting resistor 222, and is configured such that the fourth inductor 220 limits the changing speed of the driving current Iout. The current detecting resistor 222 corresponds to the current detecting resistor 122. One end of the fourth inductor 220 is connected to a cathode of the third diode 218. An anode of the third diode 218 is grounded. A sixth connection node N6 between one end of the fourth inductor 220 and the cathode of the third diode 218 is connected to the other end of the transfer capacitor 206.

The primary side circuit 202, the secondary side circuit 204 and the transfer capacitor 206 constitutes a configuration corresponding to a configuration in which the smoothing capacitor of the output stage is excluded from the Zeta converter. Accordingly, the power conversion unit 200 is a non-inversion type converter which steps-up/steps-down the input voltage Vin to be output without inverting the polarity of the input voltage Vin. The power conversion unit 200 is configured such that the driving current Iout increases when the second switching element 216 is ON.

The LED lighting circuit according to the first modified example achieves the same operational effect as that achieved by the LED lighting circuit 10 according to the embodiment. Further, the LED lighting circuit according to the first modified example is appropriate for an application which is not intended for inverting the polarity of the input voltage.

Further, a high side switching is implemented in the LED lighting circuit according to the first modified example. Here, when the n-type MOSFET is used as the switching element, the source voltage becomes a negative voltage and thus it becomes difficult to perform a high frequency switching. Accordingly, the p-type MOSFET is used. However, generally, the p-type MOSFET is worse than the n-type MOSFET in an electric power efficiency. Accordingly, the LED lighting circuit 10 according to the embodiment in which the n-type MOSFET may be used as the switching element is advantageous over the LED lighting circuit according to the first modified example in electric power efficiency.

In the embodiment, descriptions have been made on a case where the suppression unit 130 causes some of the driving current Iout to bypass when the driving current Iout begins to overshoot, but the present disclosure is not limited thereto. For example, the suppression unit may forcedly discharge the transfer capacitor 106 when the driving current Iout begins to overshoot. In this case, the suppression unit is provided in parallel with the first diode 118. However, it amounts to an addition of circuit which forcedly discharges currents to the anode of the first diode 118 which oscillates at a high frequency and thus, a circuit configuration may become relatively more complicated than the suppression unit 130 in the embodiment.

Otherwise, or further, the suppression unit may further limit or clamp the driving current Iout in order not for the driving current Iout to overshoot. In this case, the driving current Iout during the overshoot may be more directly limited, but a control voltage for limiting the driving current Iout needs to be a negative voltage. Therefore, a circuit configuration may become relatively more complicated than the suppression unit 130 in the embodiment. When the power conversion unit is configured in "Zeta (positive electrode output)" scheme, it is easy to configure a clamp circuit. However, the p-type MOSFET needs to be used in the switching element as described above. Therefore, it becomes to balance with demerit thereof.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A light source control device, comprising:
a conversion unit configured to generate a driving current flowing in a target light source to be driven; and
a control unit configured to control the conversion unit,
wherein the conversion unit includes a primary side circuit, a secondary side circuit, and a capacitor provided between the primary side circuit and the secondary side circuit,
the primary side circuit includes a switching element and a first inductor and is configured such that energy is stored in the first inductor when a switching element is ON,
the secondary side circuit includes a second inductor and is configured such that a changing speed of the driving current is limited by the second inductor,
the conversion unit is configured such that the driving current is raised when the switching element is ON, and
the control unit turns OFF the switching element when a magnitude of the driving current exceeds a first threshold value, and turns ON the switching element when the magnitude of the driving current falls below a second threshold value which is smaller than the first threshold value.

2. The light source control device according to claim 1, wherein the light source is a plurality of semiconductor light sources connected in series with each other, and
the light source control device further comprising at least one bypass switch connected in parallel with at least one of the plurality of semiconductor light sources.

3. The light source control device according to claim 1, wherein when it is assumed that an average value of the first threshold value and the second threshold value, a minimum value of a voltage required for driving the light source and an ON/OFF frequency of the switching element are referred to as an average driving current, a minimum light source voltage and a driving frequency, respectively, a capacitance of the capacitor is larger than a value obtained by dividing the average driving current by a value obtained by multiplying the driving frequency and the minimum light source voltage.

4. The light source control device according to claim 1, wherein the control unit further includes a compensation unit configured to reduce the first threshold value as a period during which the switching element is ON becomes longer.

5. The light source control device according to claim 1, wherein the conversion unit further includes a suppression unit configured to suppress the driving current when the magnitude of the driving current exceeds a third threshold value larger than the first threshold value.

6. The light source control device according to claim 1, wherein a DC input voltage is applied to one end of the first inductor, the other end of the first inductor is connected to one end of the switching element, a fixed voltage is applied to the other end of the switching element, and one end of the capacitor is connected to the other end of the first inductor.

7. The light source control device according to claim 2, wherein when it is assumed that an average value of the first threshold value and the second threshold value, a minimum value of a voltage required for driving the light source and an ON/OFF frequency of the switching element are referred to as an average driving current, a minimum light source voltage and a driving frequency, respectively, a capacitance of the capacitor is larger than a value obtained by dividing the average driving current by a value obtained by multiplying the driving frequency and the minimum light source voltage.

8. The light source control device according to claim 2, wherein the control unit further includes a compensation unit configured to reduce the first threshold value as a period during which the switching element is ON becomes longer.

9. The light source control device according to claim 2, wherein the conversion unit further includes a suppression unit configured to suppress the driving current when the magnitude of the driving current exceeds a third threshold value larger than the first threshold value.

10. The light source control device according to claim 2, wherein a DC input voltage is applied to one end of the first inductor, the other end of the first inductor is connected to one end of the switching element, a fixed voltage is applied to the other end of the switching element, and one end of the capacitor is connected to the other end of the first inductor.

11. The light source control device according to claim 3, wherein the control unit further includes a compensation unit configured to reduce the first threshold value as a period during which the switching element is ON becomes longer.

12. The light source control device according to claim 3, wherein the conversion unit further includes a suppression unit configured to suppress the driving current when the magnitude of the driving current exceeds a third threshold value larger than the first threshold value.

13. The light source control device according to claim 3, wherein a DC input voltage is applied to one end of the first inductor, the other end of the first inductor is connected to one end of the switching element, a fixed voltage is applied to the other end of the switching element, and one end of the capacitor is connected to the other end of the first inductor.

14. The light source control device according to claim 4, wherein a DC input voltage is applied to one end of the first inductor, the other end of the first inductor is connected to one end of the switching element, a fixed voltage is applied to the other end of the switching element, and one end of the capacitor is connected to the other end of the first inductor.

15. The light source control device according to claim 5, wherein the suppression unit of the light source control device is provided in parallel with the light source and is configured to cause some of the driving currents to bypass when the magnitude of the driving current exceeds the third threshold value.

16. The light source control device according to claim 5, wherein a DC input voltage is applied to one end of the first inductor, the other end of the first inductor is connected to one end of the switching element, a fixed voltage is applied to the other end of the switching element, and one end of the capacitor is connected to the other end of the first inductor.

17. The light source control device according to claim 15, wherein a DC input voltage is applied to one end of the first inductor, the other end of the first inductor is connected to one end of the switching element, a fixed voltage is applied to the other end of the switching element, and one end of the capacitor is connected to the other end of the first inductor.

* * * * *